Figure 1:
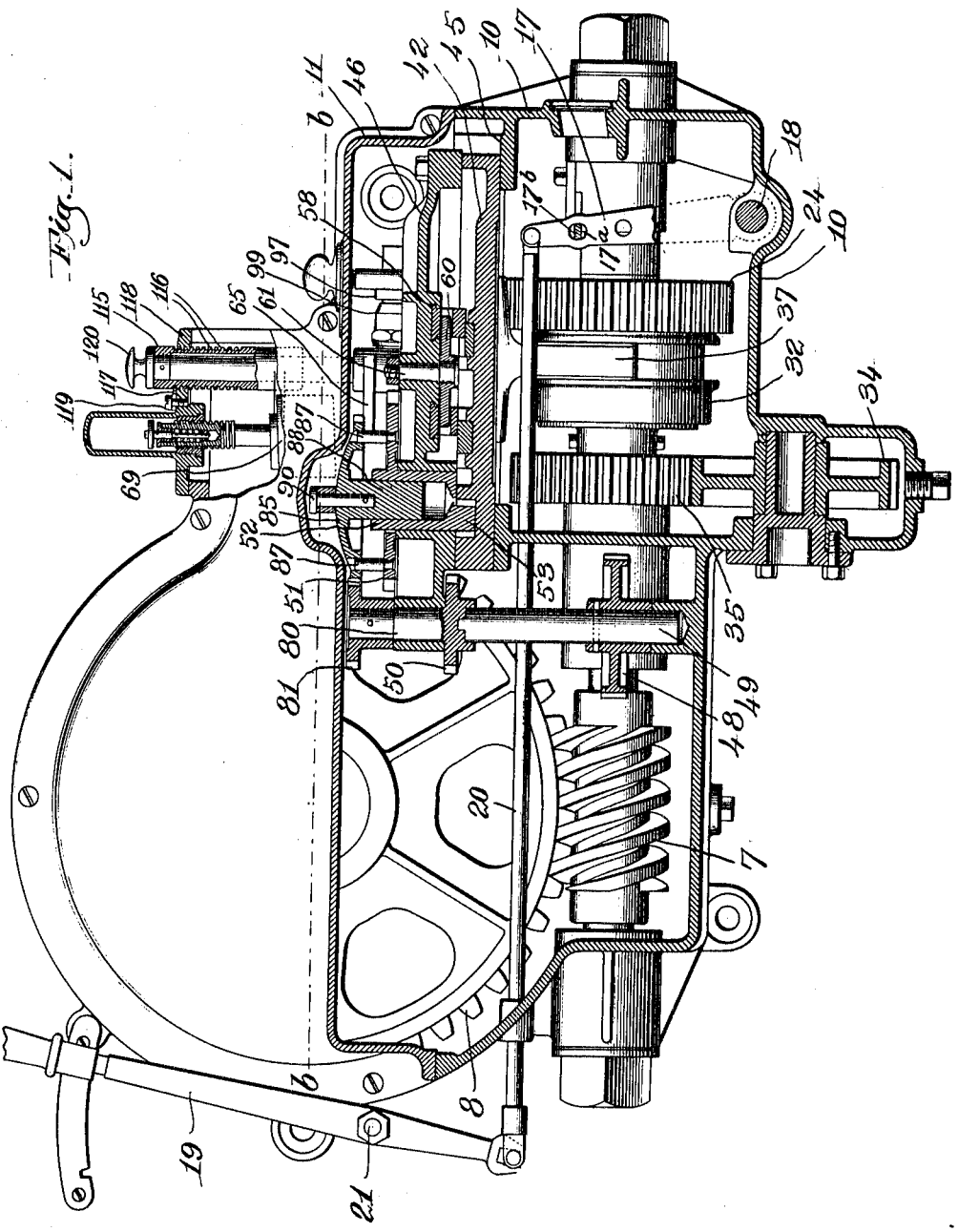

W. A. E. HENRICI.
REVERSING MECHANISM.
APPLICATION FILED AUG. 3, 1908.

1,088,660.

Patented Feb. 24, 1914.

7 SHEETS—SHEET 1.

Witnesses.
Thomas J. Drummond
Joseph M. Ward.

Inventor.
William A. E. Henrici,
by Dooley Gregory
Atty's.

W. A. E. HENRICI.
REVERSING MECHANISM.
APPLICATION FILED AUG. 3, 1908.

1,088,660.

Patented Feb. 24, 1914.
7 SHEETS—SHEET 4.

Witnesses.
Thomas J. Drummond
Joseph M. Ward.

Inventor.
William A. E. Henrici,
by Cooley Gregory
attys.

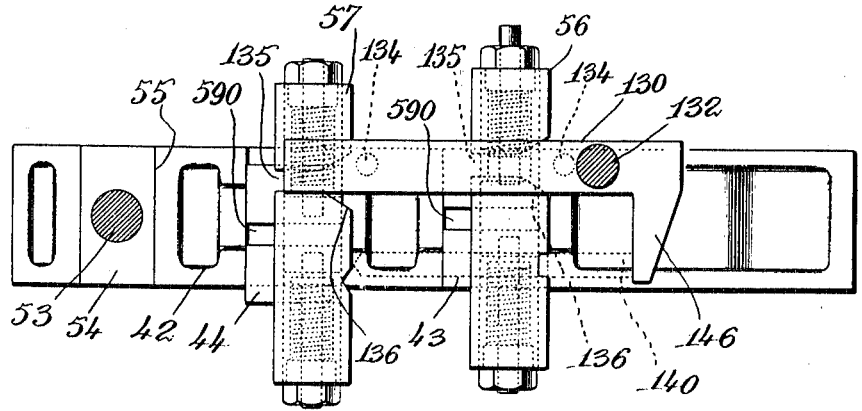
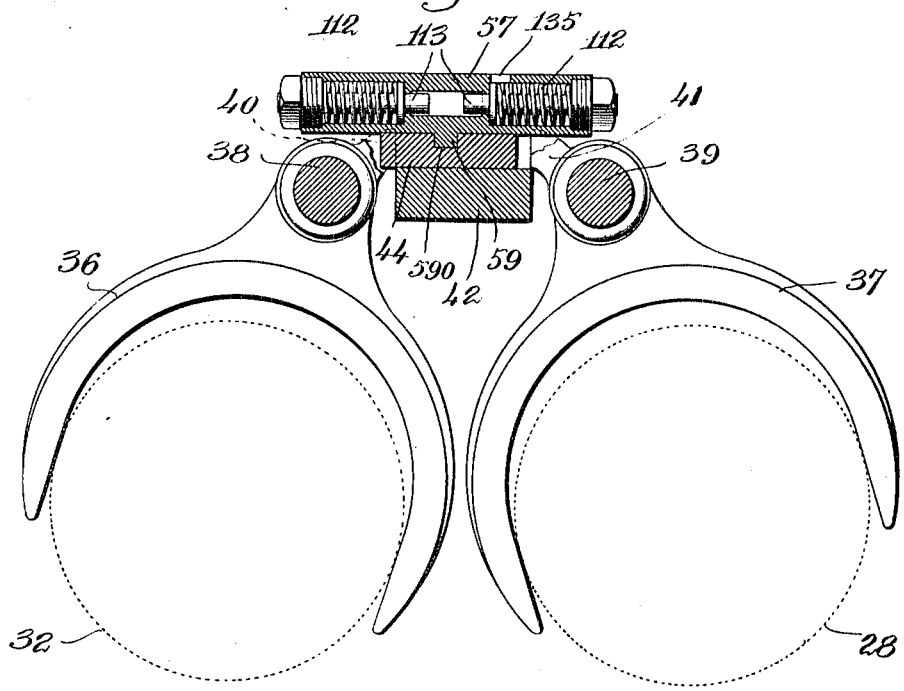

W. A. E. HENRICI.
REVERSING MECHANISM.
APPLICATION FILED AUG. 3, 1908.
1,088,660.
Patented Feb. 24, 1914.
7 SHEETS—SHEET 6.
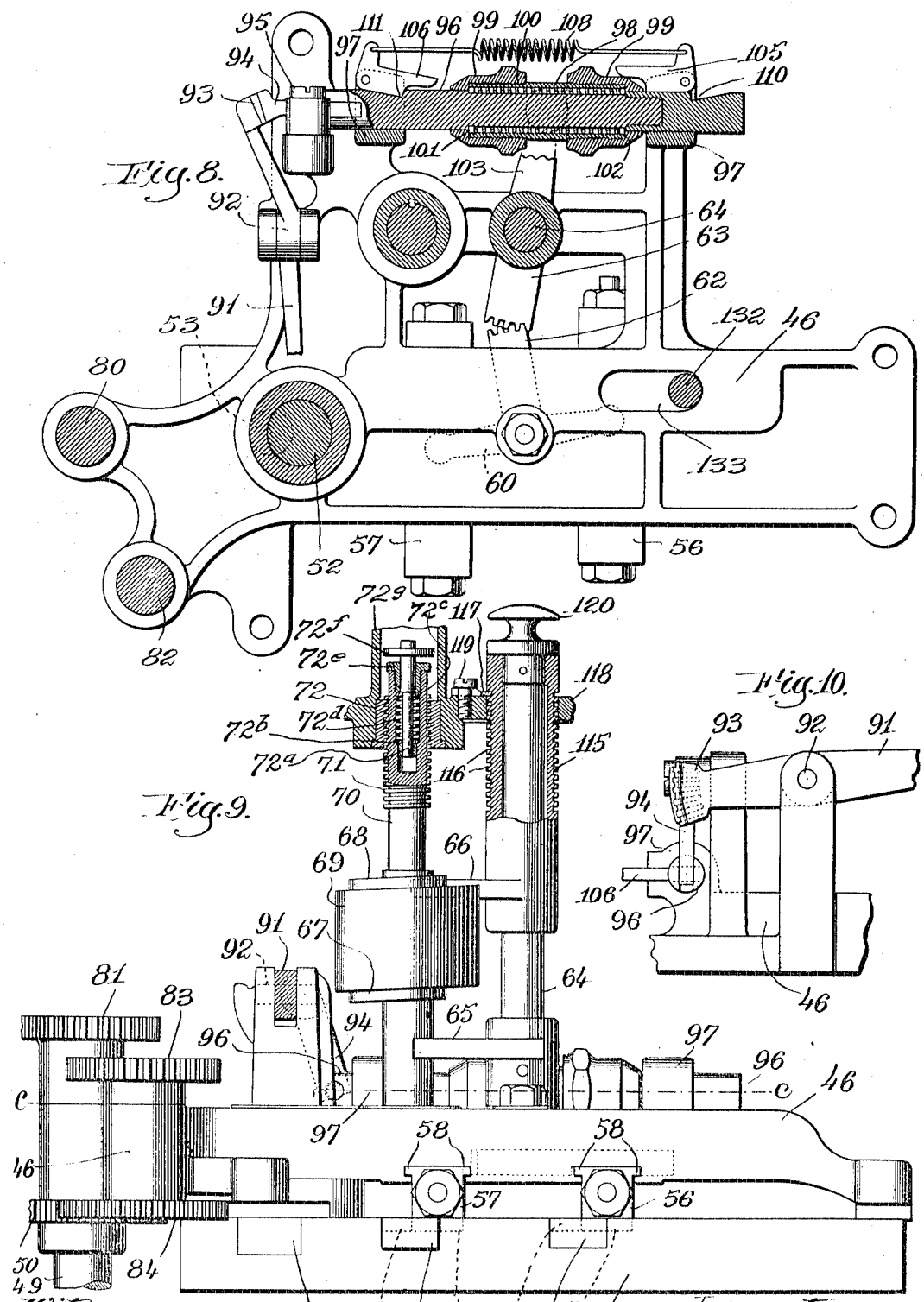

W. A. E. HENRICI.
REVERSING MECHANISM.
APPLICATION FILED AUG. 3, 1908.
1,088,660.
Patented Feb. 24, 1914.
7 SHEETS—SHEET 7.
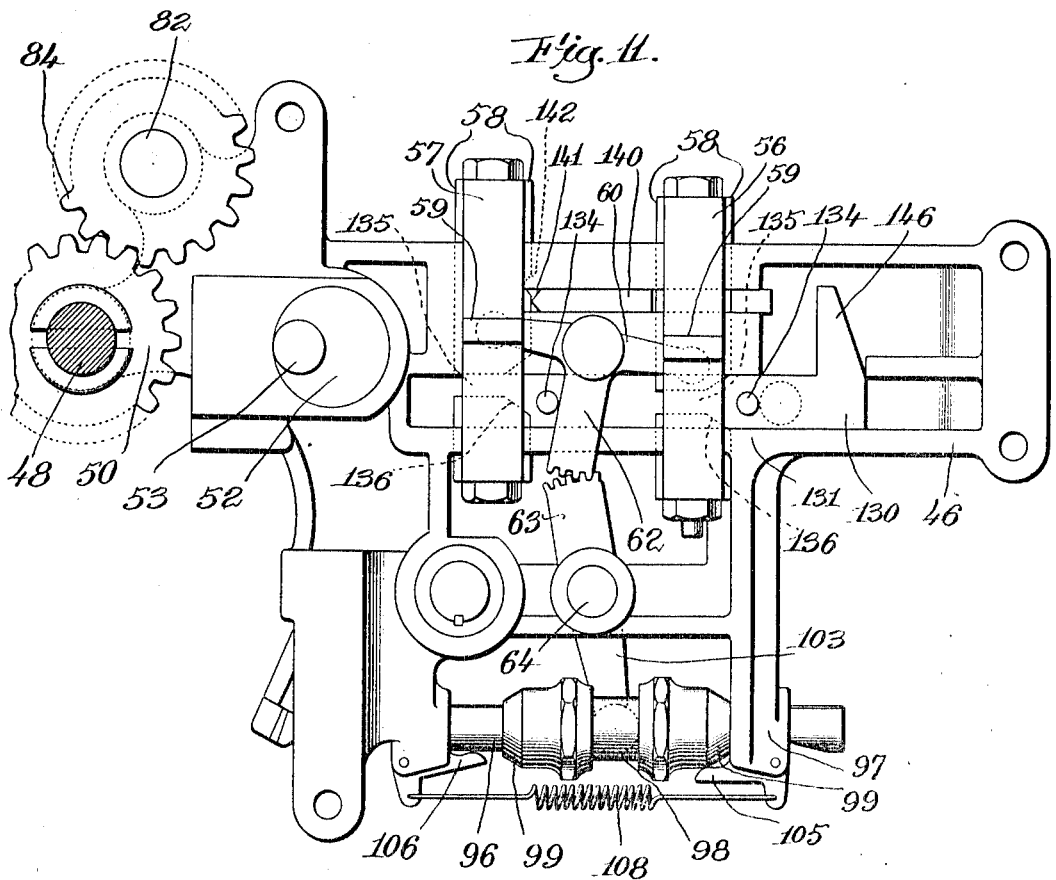
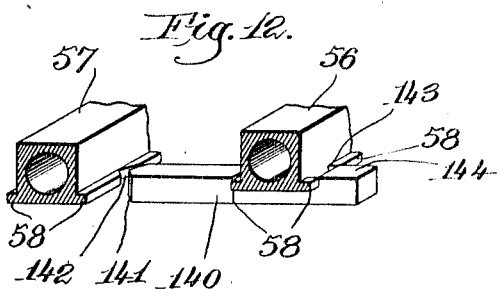

UNITED STATES PATENT OFFICE.

WILLIAM A. E. HENRICI, OF BOSTON, MASSACHUSETTS, ASSIGNOR, BY MESNE ASSIGNMENTS, TO LIBERTY TRUST COMPANY, TRUSTEE, OF BOSTON, MASSACHUSETTS, A CORPORATION OF MASSACHUSETTS.

REVERSING MECHANISM.

1,088,660. Specification of Letters Patent. Patented Feb. 24, 1914.

Application filed August 3, 1908. Serial No. 446,604.

*To all whom it may concern:*

Be it known that I, WILLIAM A. E. HENRICI, a citizen of the United States, residing at Boston, county of Suffolk, and State of Massachusetts, have invented an Improvement in Reversing Mechanism, of which the following description, in connection with the accompanying drawing, is a specification, like letters on the drawing representing like parts.

This invention relates to a driving mechanism which is adapted to automatically reverse the direction of rotation of the driven element at stated or predetermined times. The device has been especially designed for use in connection with a washing machine for rotating the drum thereof first in one direction and then in the other, but it will be obvious that the invention is not limited to use in connection with a washing machine but may be used in connection with any device where it is desired to provide for reversing automatically the direction of rotation of the driven element at stated periods of time.

Figure 2:
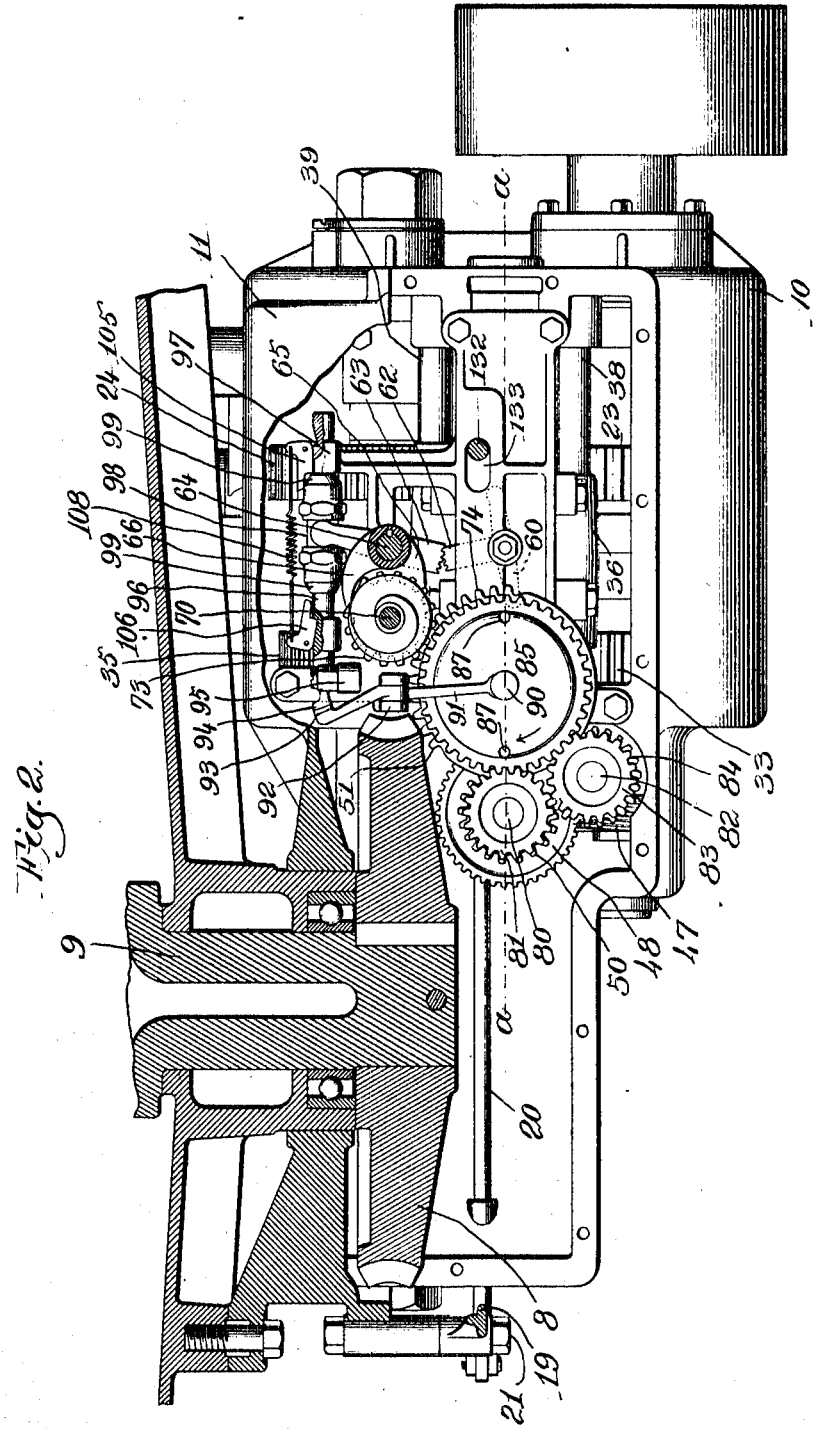
Figure 3:
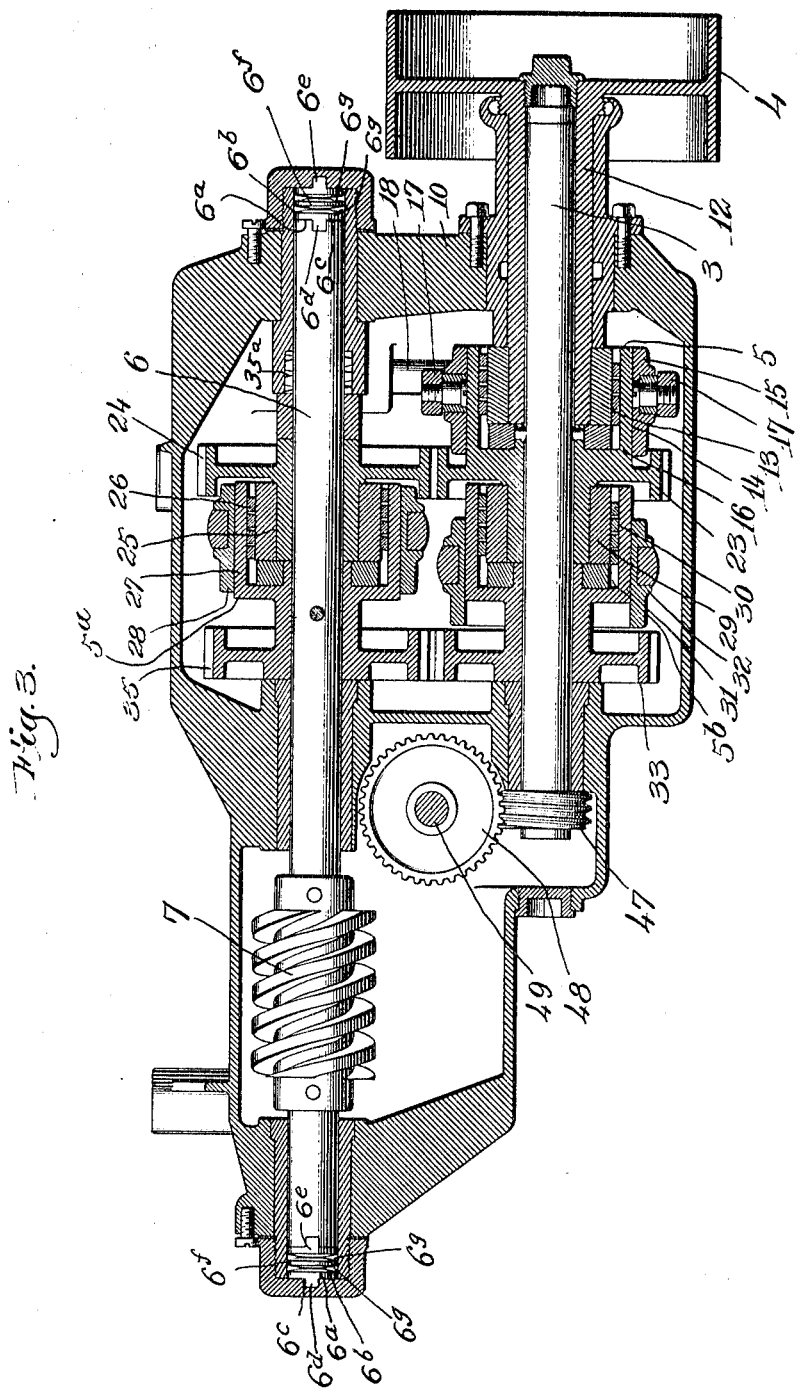
Figure 4:
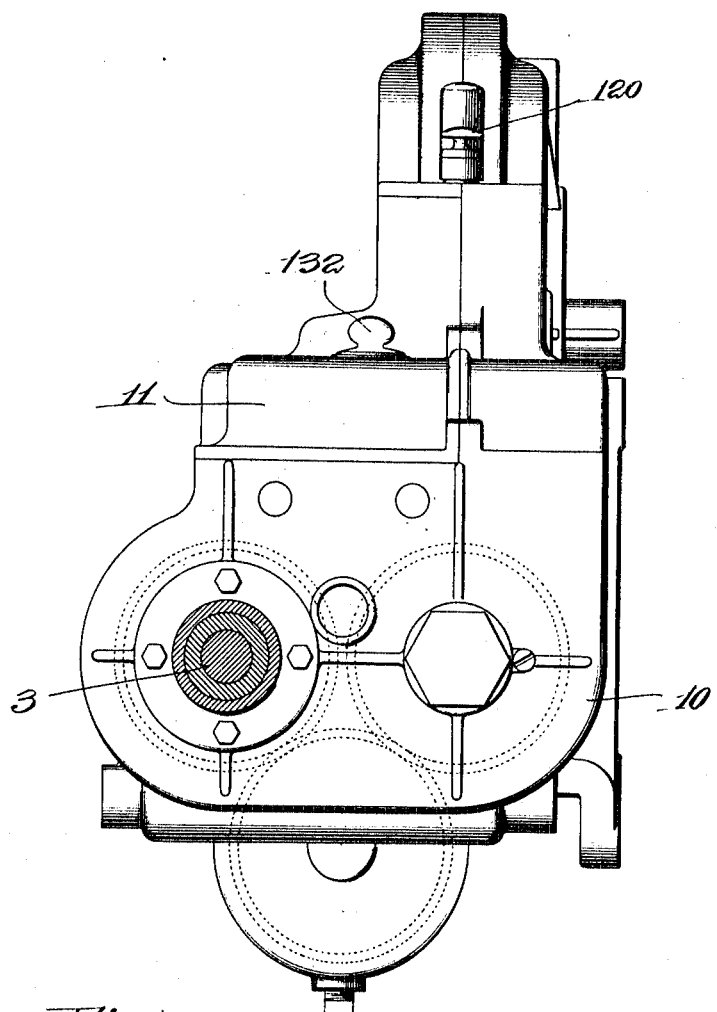
Figure 5:
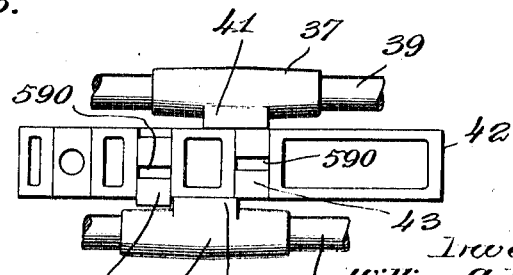

Figure 1 is a vertical sectional view of the driving mechanism on substantially the line $a$—$a$, Fig. 2; Fig. 2 is a horizontal sectional view on substantially the line $b$—$b$, Fig. 1, said figure showing the casing for the gearing broken out to better show the construction; Fig. 3 is a horizontal section through the shaft supporting the clutches; Fig. 4 is an end view of the casing supporting the driving mechanism, the driving shaft being shown in section; Fig. 5 is a detail of the clutch-reversing mechanism; Fig. 6 is a fragmentary view showing the bolt carriers in plan; Fig. 7 is a sectional view through one of the bolt carriers and the bolt operated thereby, said view also showing the clutch-operating yokes; Fig. 8 is a section on substantially the line $c$—$c$, Fig. 9 looking downwardly; Fig. 9 is a side view of the reversing mechanism; Fig. 10 is a detail of the reversing mechanism; Fig. 11 is a bottom plan view of the frame sustaining the bolt carriers showing the mechanism for operating the bolts; Fig. 12 is a detail of the bolt carriers showing the locking device therefor.

The invention is herein embodied in a device involving a driving shaft to which a driving pulley is secured and a separate driven shaft which is geared to and operates the mechanism or other part to be driven. Each shaft has mounted thereon a clutch and the two shafts and the clutch members thereon are so connected together that when one clutch is in engagement the driven shaft will be driven in one direction while when the other clutch is in engagement the driven shaft will be driven in the opposite direction.

Referring now to the drawings and especially to Figs. 1, 2 and 3, the driving shaft is shown at 3 and it is adapted to be operated by a driving pulley 4 which is arranged to be clutched to the driving shaft or unclutched therefrom by means of a suitable clutch 5. The driven shaft is shown at 6 and it may be geared or connected to the device to be operated in any suitable manner according to the character of said device. In the embodiment of the invention which I have herein selected for illustrating my invention, said driven shaft has thereon a worm 7 which meshes with and drives a worm gear 8 that is sustained on a shaft 9. Where the device is used in connection with a washing machine, this shaft 9 may be that which carries the drum of the washing machine, but I wish it distinctly understood that the character of the mechanism or machine with which my invention is used has nothing to do with the invention, and the latter may be used with any apparatus or machine. These driving and driven shafts 3 and 6 are sustained in bearings in a suitable frame or casing 10, and the entire reversing mechanism is also preferably inclosed in a gear casing 11 which is secured to the casing 10 although this is not essential to the invention.

By the worm and worm gear connection between the shafts 6 and 9 above described, it is obvious that the load will be imposed on shaft 6 in the form of a longitudinal thrust, and to enable the shaft 6 to carry this load with as little friction as possible I have provided, see Fig. 3, novel bearings for said shaft which are shown as comprising hardened shaft disks $6^a$, having each a convex face $6^b$ and flat opposed face $6^c$ provided with a rib $6^d$ which may be received by a similarly shaped slot in each end of the shaft 6. The provision of these hardened disks obviates the necessity on the one hand of hardening the whole shaft after it is turned, which would be likely to warp it, and on the other hand it obviates the necessity of turning the shaft from the material which has been previously suitably hardened to the extent required, the latter course being both difficult and expensive. Similarly formed disks 6e are positioned one at either end of the shaft in the case 10, and between said disks and the disks 6a are positioned, one at each end, disks 6f, each having two convex faces 6g so that the shaft 6 is thereby provided with particularly efficient bearings.

The driving pulley 4 is shown as mounted on a sleeve 12 which surrounds the driving shaft 3, and the clutch 5 for clutching said sleeve to the driving shaft is inclosed within the gear casing 10, 11. The clutch 5 may have any suitable or usual construction but preferably I will employ a clutch of the character shown either in my Patent No. 840,847, dated January 8, 1907, or in my copending application Se. No. 412,534, filed January 25, 1908. Both of these clutches are of that type which includes a friction coil which surrounds a drum and which is adapted to be tightened about the drum when the clutch is in operative engagement. Since the clutch forms no part of my present invention I have not deemed it necessary to illustrate the clutch in detail.

In Figs. 1 and 3 the clutch is shown sufficiently for the purposes of this application. It comprises the drum 13 which is rigid with the sleeve 12 and which is surrounded by the friction coil 14 which is carried by and is rotatable with a shell 16 which is fast on the shaft 3. Said coil 14 is tightened about the drum by means of a sliding actuator, not shown, which is operated by moving the clutch-actuating sleeve 15 longitudinally of the shaft. This clutch-actuating sleeve 15 is shown as supported by the shell 16, and said sleeve is given its movement by means of a yoked lever 17 which is pivoted to the gear casing 10 at 18 and which is operated by a lever 19 situated exterior to the gear casing and pivoted thereto at 21, said lever being connected to the yoked lever 17 by means of the link or connection 20. The movement of the clutch-actuating sleeve 15 to the right Figs. 1 and 3 throws the clutch into engagement and its movement to the left disengages the clutch. A clutch having this construction is more completely described in my said patent and application to which reference may be had. The lever 17 is provided, see Fig. 1, and herein near its upper end, with an aperture 17a to receive one end of the brake rod 17b which actuates the brake on the driven shaft 6 and will be subsequently further described.
The shell 16 has rigid therewith the gear 23 which meshes with and drives a gear 24 loose on the driven shaft 6. Said gear 24 has rigid therewith a drum 25 of another clutch 5a which is similar in construction to the clutch 5, and the friction coil 26 of said clutch 5a is inclosed in and carried by a shell or barrel 27 which is rigid with the driving shaft 6. The clutch 5a on the driving shaft 6 is thrown into operative engagement or disengaged by movement of the clutch-actuating sleeve 28 which surrounds the shell. The driving shaft 3 also has fast thereon the drum 29 of another clutch 5b (which is similar in construction to the clutch 5), said drum preferably being rigid with the gear 23. This drum is surrounded by a friction coil 30 which is received within the shell or barrel 31, and said coil 30 is tightened about its drum by movement of the clutch-actuating sleeve 32 which surrounds the shell 31. The shell or barrel 31 is loose upon the driving shaft 3 and has rigid therewith a gear 33 which meshes with and drives an idler 34, see Figs. 1 and 4, which idler meshes with and drives a gear 35 fast on the driven shaft 6. With such an arrangement of gearing and clutches it will be seen that when the clutch on the shaft 3 is engaged and the clutch on the shaft 6 is disengaged, as illustrated in Fig. 3, then the gear 33 will be clutched to said shaft 3, while the gear 24 will be unclutched from the shaft 6. When the driving shaft 3 is rotated therefore the gear 33 will be rotated with said shaft and said gear will rotate the driven shaft 6 through the intermediate gear 34. When the clutches are set in this manner, the shaft 6 will rotate in the same direction as the shaft 3, and during such rotation the gear 24 will turn loosely on said driven shaft 6. If, on the other hand, the clutches are reversed, that is, the clutch on the shaft 3 is disengaged while the clutch on the shaft 6 is engaged, then the gear 33 will be loose on the shaft 3, while the gear 24 is clutched to the shaft 6. The rotation of the shaft 3 will, therefore, rotate the gear 23 which is fast thereon, and said gear will rotate the gear 24 which is clutched to the shaft 6, in which case the shaft 6 is rotated in an opposite direction to that in which the shaft 3 is rotated. Under these latter conditions, the gear 33 merely runs loosely on the shaft 3, this being permitted because the clutch on said shaft is disengaged.

It will thus be seen that when the clutch on the shaft 3 is engaged and that on the shaft 6 is disengaged, the driven shaft is rotated in the same direction as that of the driving shaft, while when the clutch on the driving shaft 3 is disengaged and that on the driven shaft 6 is engaged, said driven shaft will be rotated in an opposite direction from that of the driving shaft.

In order that the driven shaft 6 and the machine operated thereby may be stopped quickly when the pulley clutch 5 is unlocked from the shaft 3, I have provided a brake for said shaft, here shown as a spring member 35ª coiled about the shaft and adapted to be automatically tightened thereabout by means of the brake rod 17ᵇ, see Fig. 1, actuated in turn by movement of the lever 17, to unlock the clutch 5 from the shaft 3. On the other hand, the reverse movement of the lever 17 to lock the clutch 5 to the shaft 3 will automatically unlock the brake 35ª from the shaft 6.

The clutch-actuating sleeves 32 and 28 are given their movement by means of two clutch actuators 36, 37, see Figs. 1 and 7, these clutch actuators being herein shown in the form of yokes which embrace the clutch-actuating sleeves and are received in annular grooves therein. These clutch actuators are slidably mounted on rods or supports 38 and 39, see Figs. 2 and 7.

My invention includes a mechanism by which the clutch actuators 36 and 37 may be automatically operated thereby to reverse the direction of rotation of the driven shaft. The invention also includes a mechanism by which the time of reversing of the driven shaft 6 may be adjusted.

For operating the clutch actuators 36, 37, I have provided the following mechanism: The clutch actuator 36 is provided with a nose or projection 40 and the clutch actuator 37 is provided with a similar nose or projection 41, see Fig. 5. Situated between the noses 40 and 41 is a slide 42 provided with two transverse grooves in one of which is received a clutch-engaging bolt 43, and in the other of which is received a clutch-disengaging bolt 44. These bolts are of a length equal to the width of the slide, as plainly indicated in Figs. 5 and 7, so that when they are in their central position, as shown by the position of the bolt 43, Fig. 5, the movement of the slide will not operate the clutch actuators 36, 37. If, however, the bolt 44 is thrown out into the position shown in Fig. 5, then the movement of the slide 42 to the right in said figure will carry said bolt against the nose 40 and shift the clutch actuator 36 thereby to disengage the clutch 5ᵇ on the driving shaft 3. If when the slide 42 reaches the limit of its movement to the right and the bolt 43 is carried beyond the nose 41, said bolt 43 is moved toward the clutch actuator 37, then during the return movement of the slide the projecting end of the bolt will engage the nose 41 and shift the clutch actuator 37 to the left Fig. 5, thereby throwing the clutch 5ª on the driven shaft 6 into engagement. For disengaging the clutch 5ª the clutch-disengaging bolt 44 is moved oppositely from what is shown in Fig. 5, so that during the movement of the slide to the right the clutch actuator 37 will be moved to the right Fig. 5, and for engaging the clutch 5ᵇ on the driving shaft 3, the clutch-engaging bolt 43 is moved toward the clutch actuator 36 when the slide is at the right-hand limit of its movement, so that when the slide moves toward the left Fig. 5, the clutch actuator 36 will be moved into the position shown in Fig. 5.

The slide 42 is supported in ways 45 formed in the gear casing 10, and said slide is held in its operative position by means of a cap plate or frame 46 which is sustained above the slide by the gear casing 10. The slide is preferably operated from the driving shaft 3, and for this purpose said shaft is shown as having a worm 47 thereon which meshes with and drives a worm gear 48 on a vertically-extending shaft 49. Said shaft is connected to and drives a gear 50 and said gear operates through other gears of the reversing mechanism which will be hereinafter described to drive a gear 51 which is fast on a shaft 52 that is journaled in the cap plate or frame 46, said shaft 52 having at its lower end a crank pin 53 which is received in a block 54 that slides back and forth in a groove 55 formed in the slide 42. The rotation of the shaft 52, therefore, operates to give the slide its reciprocating movement.

The bolts 43 and 44 are operated directly by bolt carriers 56 and 57. These bolt carriers are slidably mounted in the frame 46 for movement transversely of the slide, each bolt carrier being formed with the ribs 58 which are received in ways in the frame 46. Each bolt carrier is also provided on its under side with a rib 59 which is received in a groove 590 formed in the corresponding bolt, said ribs operating to lock the bolts to the bolt carriers, so that movement of the bolt carriers transversely of the slide will operate to shift the bolts in the slide. It will be noted that the bolts move back and forth with the slide, but this ribbed connection between the bolt carriers and the bolts permits this movement of the bolts while maintaining operative connections between the bolts and the bolt carriers. The bolt carriers are operated for shifting the bolts by means of a rocker member 60, see Figs. 1, 2, 6, 8 and 11, which is carried by the stud 61 mounted in the frame 46, the extremities of the arms of the rocker being received in apertures formed in the bolt carriers. Each bolt carrier sustains a pair of spring-pressed pins 113 each acted on by a spring 112 which tends to move the pin toward the center of the bolt carrier. The ends of the arms of the rocker are received between said pairs of pins and the latter and their springs furnish a yielding connection between the rocker and the bolt carriers, the purpose of which will be explained more fully hereinafter.

The rocker 60 is operated first in one direction and then in the other for shifting the clutches by a time mechanism which in turn is operated from the driving shaft 3. While it is within my invention to employ time mechanisms of different characters, yet I find that herein illustrated and described to be a satisfactory one.

As herein shown the rocker 60 has rigid therewith an arm 62 which is geared to an arm 63 rigid with a shaft 64 also supported in the frame 46. The shaft 64 has fast thereon two arms 65 and 66 which are adapted to be actuated by cam surfaces 67 and 68, respectively, on a cam member 69. These cam surfaces have a spiral shape as plainly seen in Figs. 2 and 9, and the cam 69 is arranged both to rotate and to move longitudinally as it rotates whereby as said cam moves, one or the other of the cam shoulders engages one or the other of the arms 66 or 65 and thereby rocks the shaft 64, the rocking of the shaft obviously operating the rocker 60 to shift the bolt carrier. For giving the cam 69 its two movements, I have mounted it on a shaft 70 which is journaled at its lower end in the frame 46 and which at its upper end has the screw-threaded portion 71 that screw-threads into a fixed nut 72. The screw-threaded engagement with the nut 72 obviously gives the shaft a movement longitudinally thereof as it is rotated. For rotating the shaft it has splined thereto a gear 73 which is journaled in bearings in the frame 46, said gear being confined in the bearings against movement longitudinally of the shaft 70. The gear 73 meshes with and is driven by the gear 51 which is rigid with the shaft 53 above referred to. The gear 51 is preferably a mutilated gear, as plainly seen in Fig. 2, so that it will operate the gear 73 intermittently, the construction being such that the gear 73 will make one complete rotation during each rotation of the gear 51, the complete rotation of the gear 73 occurring during a partial rotation of the gear 51, and the gear 73 remaining at rest during the remaining portion of the rotation of said gear 51.

For securing the reversing movement it is necessary that the shaft 64 should rock first in one direction and then in the other and therefore mechanism is provided for rotating the shaft 70 first in one direction and then in the other, the rotation of the shaft 70 in one direction obviously moving it longitudinally upwardly, Fig. 9, thereby to bring the cam shoulder 68 into engagement with the arm 66, and the movement in the opposite direction carrying said shaft downwardly thereby to bring the cam shoulder 67 into engagement with the arm 65. For thus reversing the direction of rotation of the shaft 70 I have herein provided the following mechanism: The gear 50 which is connected to the shaft 49 is mounted on a stud 80 which is journaled in the frame 46 and which carries at its upper end a gear 81. Said frame 46 also has journaled therein another stud 82 which has thereon two gears 83, 84. The gear 84 meshes constantly with the gear 50 but the gear 83 is situated at a lower level than the gear 81, as plainly seen in Fig. 9, and does not mesh therewith. The gear 51 has connected therewith a reversing gear 85, said reversing gear being locked to the gear 51, so that they rotate in unison but being shiftable vertically so that it may be brought into mesh with either of the gears 81 or 83. To permit of this movement of the gear 85, said gear 51 is shown as having two pins 87 rising therefrom, which pins play in apertures formed in the reversing gear 85, and said reversing gear has rigid therewith a stem 88 which is received in an axial bore formed in the shaft or stud 53, as seen in Fig. 1. When the reversing gear 85 is elevated, as shown in Fig. 1, so that it meshes directly with the gear 81, then the rotation of the shaft 49 is communicated directly through the gear 50, stud 80 and gear 81 to the gear 85, from which it is communicated through the pins 87 to the gear 51 and from the latter to the gear 73 and shaft 70. If, on the other hand, the reversing gear 85 is lowered to carry it out of mesh with the gear 81 and into mesh with the gear 83, then the rotation of the shaft 49 will be communicated through the gear 50 to the gears 83 and 84 and from the latter gear to the reversing gear 85. These gears 84 and 85 constitute intermediate gears, and when the reversing gear 85 is in mesh with the gear 81 the shaft 70 will be rotated in one direction, while when said gear is in mesh with the gear 84, the shaft will be rotated in the opposite direction, as will be obvious.

For shifting the position of the reversing gear, I have provided mechanism which is controlled by the cam member 69 of the time mechanism. The gear 85 has rigid therewith a headed pin 90 which is embraced by the forked end of a lever 91, said lever being pivoted to the frame 46 at 92, see Figs. 2, 8 and 10, and having one end formed with gear teeth 93 which mesh with gear teeth formed on an elbow-lever 94 also pivoted to the frame 46 at 95. One arm of the elbow-lever 94 is pivotally connected to a throw member 96 which is mounted to slide back and forth in bearings 97 formed in the frame 46. The mechanism for operating the throw member is such that movement thereof at the proper time will be a quick movement. For this purpose the throw member is actuated directly by a spring which is put under compression gradually by the turning movement of the shaft 64, and provision is made for releasing the spring at the proper time to permit the throw member to operate quickly. As herein shown, said throw member has surrounding the same a sleeve 98 having rigid therewith at each end cam members 99. Situated between the sleeve 98 and the throw member is a coiled spring 100 which is confined between the shoulders 101 formed on said throw member and also between other shoulders 102 formed on the cam members 99. The space between the cam members 99 constitutes a groove in which is received the end of a lever 103 that is rigid with the shaft 64.

105 and 106 are two latches which are pivoted to the bearings 97 and which are connected by a spring 108. These latches are adapted to engage notches 110 and 111 in the throw member and are for the purpose of normally holding the throw member 96 from movement. They are released at the proper times by the engagement of the cam members 99 therewith. When the parts are in the position shown in Fig. 8, the latch 106 is in engagement with its notch 111 in the throw member, and said member is prevented from movement toward the left. As the shaft 64 turns to swing the arm 103 toward the left, the sleeve 98 with the cam members is moved on the throw member 96 and during such movement the spring 100 will be compressed. When the sleeve has moved sufficiently toward the left to bring the cam member 99 into engagement with the latch 106 the latch is forced backwardly out of engagement with the notch 111 in the throw member and the resiliency of the spring 100 will then shift the throw member toward the left with a quick movement, such shifting movement of the throw member rocking the elbow lever 94 and through its connection with the lever 91 turning said latter lever to carry the gear 85 downwardly out of mesh with the gear 81 and into mesh with the gear 83, thus reversing the direction of movement of the shaft 70. When the throw member has been moved to the limit of its movement to the left Fig. 1, the latch 105 drops into engagement with the notch 110 in said throw member, thus locking it from movement toward the right, and when the shaft 64 turns in a direction to swing the arm 103 to the right the sleeve is moved to depress the spring 100 and when the cam member 99 on the sleeve has released the latch 105 the throw member is shifted toward the right with a quick movement thereby reversing the position of the gear 85 and carrying it into the position shown in full lines Fig. 1 again.

To guard against dislocation of the cam shaft 70 from its alinement, if for any reason the cam 69 should fail to actuate the reversing mechanism, as for instance, if any foreign matter or member should become so wedged between the gears as to prevent the throwing of the bolts 44, I have provided a cam shaft balancing means. This balancing means, while permitting continued rotation of the cam shaft 70, under such circumstances as just referred to, will however retain the shaft in alinement and in position to again become operative as soon as the trouble has been remedied.

From the described construction of the cam shaft, it will be evident that if, for any reason, the shaft 64 is prevented from rocking to throw the bolts 44, the cam shaft 70 will continue to rotate in one direction until the screw thread thereon runs out and becomes disengaged from the nut 72. In this case if the shaft be traveling upwardly it will very likely become dislocated from its proper alinement. If, on the other hand, the shaft be traveling downwardly, it may drop when it becomes disengaged from the nut 72. In either of such cases it is most desirable to retain the shaft in alinement with the nut 72, so that the thread may engage the nut again when the machine has been reversed. To accomplish this result, I have drilled the upper end of the shaft 70 vertically and inserted therein a spring actuated plunger $72^a$. This plunger is provided with two collars $72^b$ and $72^c$ fast thereon and between said collars and seated thereagainst is a coiled spring $72^d$. The plunger is retained in position in the shaft 70 by a thimble $72^e$ threaded into the upper end of the shaft. If the reversing means fails to work and the shaft 70 continues to travel upwardly, just as the shaft 70 becomes disengaged from the nut 72 the head $72^f$ of the plunger $72^a$ will strike the top of the dome $72^g$, see Fig. 1, and compress the spring $72^d$ sufficiently to retain the shaft 70 in alinement with the nut 72 and ready to engage the same again, permitting the shaft to rotate freely in the meantime however. If the shaft travels downwardly through the nut 72, the head $72^f$ of the plunger will rest on the upper end of the nut and, while permitting the shaft 70 to rotate, the spring $72^d$ will act to keep the shaft from dropping away from the nut and will retain it in alinement therewith ready to engage the same when the mechanism has been reversed.

While the operation of the parts as thus far described will be apparent to those skilled in the art, yet a clearer comprehension of the invention may be had if the operation is briefly described.

Assuming that the clutches are in the position shown in Fig. 3 with the clutch $5^b$ on the driving shaft 3 out of engagement and the clutch $5^a$ on the driven shaft 6 engaged, it will be observed that the two shafts will rotate in opposite directions and the clutch actuators 36, 37 will be in the positions shown in Fig. 5. When the clutches are in this position the gear 85 is in its lowered position meshing with the gear 83. The rotation of the driving shaft 3 will through the gears 47 and 48 operate the driving shaft 49 in a direction to turn the gear 51 in the direction of the arrow Fig. 2. Said gear meshing with the gear 73 rotates it in the direction of the arrow Fig. 2 and this gear gives rotation to the gear 51, said latter gear giving an intermittent rotation to the gear 73 in a direction to screw the shaft 70 upwardly into the nut 72 in Fig. 9. As the mechanism continues to operate, the shaft 70 is screwed upwardly in the nut 72 until the cam shoulder 68 engages the arm 66. As said arm rides up the cam shoulder 68, the shaft 64 is turned gradually and because of its geared connection with the rocker 60, said rocker is swung into the position shown in Fig. 8. The shifting of the rocker into this position will obviously throw the bolt carriers into the position shown in Figs. 6 and 8 provided the slide is so positioned that the bolts may be projected without engaging the noses 40 and 41. Assuming that the slide is in the position shown in Fig. 5, then such movement of the rocker will shift the bolt carrier 57 thereby to project the clutch-disengaging bolt 44 into the position shown in Fig. 5. The bolt carrier 56, however, is prevented from movement because the clutch-engaging bolt 43 is still in engagement with the nose 41, but the spring 112 in said bolt carrier permits the rocker to move, said spring being compressed by the movement of the rocker. The movement of the slide 42 to the right Fig. 5 brings the projected clutch-disengaging bolt 44 into engagement with the nose 40, thus shifting the clutch actuator 36 and disengaging the clutch 5$^b$ on the driving shaft 3. When the slide 42 has moved to the limit of its movement to the right, the spring 112 comes into play to project the clutch-engaging bolt 43 so that when the slide moves toward the left Fig. 5 it will engage the nose 41 and throw the clutch 5$^a$ on the driven shaft 6 out of engagement, thus reversing the direction of rotation of the driven shaft.

The swinging of the rocker 60 into the position shown in Fig. 8 operates to turn the arms 63 and 103 thereby moving the sleeve 98 on the throw member 96 and compressing the spring 100. When the sleeve has been moved sufficiently to release the latch 105 from the notch 110, the spring 100 will shift the throw member into the position shown in Fig. 8 and in doing so will operate through the lever 91 to raise the gear 85 into its elevated position, thus carrying it out of mesh with the gear 83 and into mesh with the gear 81. This is the position of the parts shown in Figs. 1, 2, 8 and 9.

The shifting of the gear 85 operates to cause a reversing in the direction of movement of the shaft 70, and as the mechanism continues to operate in the reversed direction, the shaft 70 is screwed down out of the bolt 71 until the cam shoulder 67 engages the arm 65 when the shaft 64 will be turned in a direction to project the clutch-engaging bolt 43 toward the clutch actuator 36 and to project the clutch-disengaging bolt 44 toward the clutch actuator 37. When this result is accomplished the clutches will be reversed again as above described, and at the same time the throw member will be shifted toward the left Fig. 8 to again shift the position of the gear 85 and bring it into engagement with the gear 83.

The object in making the gear 74 mutilated is so that the movement of the shaft 70 will be comparatively quick, that is, it will receive its entire movement at each step during a portion only of the complete rotation of the gear 74.

The parts are so constructed that the catches 106, 105 are not released until the fingers 65 and 66 have ridden up the cam shoulder to the periphery of the cam member.

As described above the invention is adapted for automatically reversing the direction of movement of the driven shaft at stated periods of time. I have also provided for securing this reversing at any desired periods, that is, after the driven shaft has made ten revolutions, or any other desired number of revolutions. To accomplish this the arm 66 is adjustably mounted so that it can be adjusted toward and from the arm 65. Said arm 66 is shown as carried by a sleeve 115 which is splined to the shaft 64 but which can be moved longitudinally of said shaft. To hold the sleeve in its adjusted position the latter is provided with notches 116 into one of which a sliding catch 117 may be inserted, said catch being supported by the bearing 118 at the upper end of the shaft and held in adjusted position by the screw 119. The sleeve 115 is provided at its upper end with a head 120 by which it may be raised and lowered after the catch 117 is removed.

My invention also comprehends a construction by which the device may be made to run continuously in either direction, as well as to reverse at stated intervals, as above described. To accomplish this result means are provided for locking the bolt carriers in their central or neutral position. When the bolt carriers are thus locked, any movement of the rocker 60 will simply compress the springs 112, but will not shift the bolt carriers thereby to give movement to the clutch-engaging or clutch-disengaging bolts. For thus locking the bolt carriers in their neutral position I have provided the locking slide 130 which is arranged to move back and forth in ways 131 formed in the frame 46, see Fig. 11. This locking slide is arranged to be actuated by a handle 132 which is secured thereto and which projects therefrom upwardly through the top of the gear casing 10, as shown in Fig. 4, said handle playing in a slot 133 formed in the frame 46. This locking slide has secured thereto two pins or projections 134 and each bolt carrier has formed on its upper side a groove 135 adapted to receive one of the pins. These grooves are provided with flaring mouths 136 see Figs. 6 and 11. Normally when the mechanism is in position to reverse the operation of the driven shaft, the locking slide is in the position shown in Figs. 6 and 11 with the pins 134 standing at one side of the bolt carriers. When it is desired to cause the driven shaft to rotate in one direction only, the locking slide is moved toward the left Figs. 6 and 11 by the handle 132 until the pins 134 are received in the grooves 135 when said pins will lock the bolt carriers from movement. If the bolt carriers are not centrally situated at the time that the locking slide is moved, said slide operates to centralize them by the engagement of the pins 134 with the walls of the flaring mouths 136. When the bolt carriers are unlocked so as to permit the mechanism to again reverse the direction of rotation of the driven shaft, it is essential that the bolt carrier 57 should be released first because it is that bolt carrier which controls the clutch-disengaging bolt and it is important that the clutch-disengaging bolt should be made operative to disengage the engaged clutch before the clutch-engaging bolt is made operative to engage the disengaged clutch, for otherwise the two clutches might be engaged at the same time, thus locking the mechanism. To prevent this from happening I have provided an auxiliary locking slide 140 which is mounted in the frame 46, as shown in Fig. 11, and which moves transversely of the bolt carriers. The end 141 of the slide 140 is wedge-shaped, see Figs. 11 and 12, and is adapted to engage a V-shaped notch 142 in one of the ribs 58 of the bolt carrier 57. The slide is cut away in one side to receive the top of the bolt carrier 56 and one of the ribs 58 of said bolt carrier 56 is provided with a notch 143 adapted to receive the portion 144 of the slide. The locking slide 136 is provided with the arm 146 which is of a length to engage the end of the auxiliary slide 140. When the locking slide is moved into position to lock the bolt carriers, the arm 146 engages the slide 140 and moves the latter to the left Fig. 11 thereby carrying the beveled end 141 into the V-shaped notch 142 and also carrying the portion 144 into the notch 143. This slide 140, therefore, constitutes an auxiliary lock for the bolt carrier 56 for when the slide is moved toward the right, the portion 144 acts to positively lock said bolt carrier. Therefore, even when the locking slide 130 is moved into the position shown in Figs. 6 and 11, such movement does not unlock the bolt carrier 56, for the latter will remain locked by the auxiliary locking slide 140 until said slide is moved backwardly. When the locking slide 130 is moved into the position shown in Figs. 6 and 11, the bolt carrier 57 becomes unlocked and it is free to move, but the bolt carrier 56 remains locked by the auxiliary slide 140, as above described. As soon as the bolt carrier 57 has moved in one direction or the other, the walls of the V-shaped notch 142 operate to move the auxiliary locking slide 140 to the right sufficiently to unlock the bolt carrier 56. It will be seen, however, that in any case the bolt carrier 57 must always be unlocked first and since this is the one which operates the clutch-disengaging bolt, it will follow that the engaged clutch must always be disengaged before the disengaging clutch is engaged.

Having described my invention, what I claim as new and desire to secure by Letters Patent is:—

1. In reversing mechanism, the combination with a driving shaft and a separate driven shaft, of reversing gearing connecting said shafts, said reversing gearing including a clutch on each shaft, and means operated by the driving shaft to control the operation of the clutches.

2. In reversing mechanism, the combination with a driving shaft and a separate driven shaft, of reversing gearing connecting said shafts, said reversing gearing including a clutch on each shaft, clutch-operating mechanism actuated by the driving shaft, and time mechanism to control the time of operation of the clutch-operating mechanism.

3. In reversing mechanism, the combination with a driving shaft, and a separate driven shaft, of reversing gearing connecting said shafts, said reversing gearing including a clutch on each shaft; clutch-operating mechanism actuated by the driving shaft, and time mechanism controlled by the driving shaft for controlling the time of operation of the clutches.

4. In a device of the class described, the combination with a driving shaft, of a clutch member fast thereon, a coöperating clutch member loose thereon, a separate driven shaft, a clutch member loose on the driven shaft and geared to the clutch member which is fast on the driving shaft, another clutch member fast on the driven shaft and geared with the clutch member which is loose on the driving shaft, and automatic means to operate said clutches.

5. In a device of the class described, the combination with a driving shaft, of a clutch member fast thereon, a coöperating clutch member loose thereon, a separate driven shaft, a clutch member loose on the driven shaft and geared to the clutch member which is fast on the driving shaft, another clutch member fast on the driven shaft and geared with the clutch member which is loose on the driving shaft, and automatic means operated from the driving shaft to actuate the clutches.

6. In a device of the class described, the combination with a driving shaft, of a clutch member fast thereon, a coöperating clutch member loose thereon, a separate driven shaft, a clutch member loose on the driven shaft and geared to the clutch member which is fast on the driving shaft, another clutch member fast on the driven shaft and geared with the clutch member which is loose on the driving shaft, and time mechanism controlled by the driving shaft to control the operation of the clutches.

7. In a device of the class described, the combination with a driving shaft, of a clutch member fast thereon, a coöperating clutch member loose thereon, a separate driven shaft, a clutch member loose on the driven shaft and geared to the clutch member which is fast on the driving shaft, another clutch member fast on the driven shaft and geared with the clutch member which is loose on the driving shaft, automatic means to operate the clutches, and time mechanism controlled by the driving shaft to determine the time of operation of said automatic means.

8. In a device of the class described, the combination with a driving member and a driven member, of reversing gearing connecting said members, said reversing gearing including two clutches, a continuously-reciprocating slide, clutch-operating mechanism carried thereby, and time mechanism governing the time of operation of said clutch-operating mechanism.

9. In a device of the class described, the combination with a driving member and a driven member, of reversing gearing connecting said members, said reversing gearing including two clutches, a continuously-reciprocating slide, clutch-operating mechanism carried thereby, and time mechanism controlled by the driving member for governing the time of operation of said clutch-operating mechanism.

10. In a device of the class described, the combination with a driving member and a driven member, of reversing gearing connecting said members, said reversing gearing including two clutches, a slide, means actuated by the driving member to continuously reciprocate said slide, clutch-operating means carried by the slide, and time mechanism governing the time of operation of said means.

11. In a device of the class described, the combination with a driving member and a driven member, of reversing gearing connecting said members, said reversing gearing including two clutches, a slide, means actuated by the driving member to continuously reciprocate said slide, clutch-operating means carried by the slide, and time mechanism controlled by the driving member for governing the time of operation of said means.

12. In a reversing mechanism, the combination with two clutches, of a continuously-operating slide, a clutch-engaging and a clutch-disengaging bolt carried thereby, and means to move said bolts into and out of operative position.

13. In a reversing mechanism, the combination with two clutches, of a continuously-operating slide, a clutch-engaging and a clutch-disengaging bolt carried thereby, and time mechanism to move said bolts into and out of operative position.

14. In a reversing mechanism, the combination with two clutches, of a continuously-reciprocating slide, a clutch-engaging and a clutch-disengaging bolt carried thereby, each bolt being adapted to operate each clutch, and means to operate said bolts.

15. In a reversing mechanism, the combination with two clutches, of a continuously-reciprocating slide, a clutch-engaging and a clutch-disengaging bolt carried thereby, each bolt being adapted to operate each clutch, and automatic means to operate said bolts.

16. In a reversing mechanism, the combination with two clutches, of a continuously-reciprocating slide, a clutch-engaging and a clutch-disengaging bolt carried thereby, each bolt being adapted to operate each clutch, automatic means to operate said bolts, and time mechanism to control the operation of the automatic means.

17. In a reversing mechanism, the combination with a driving member and a driven member, of reversing gearing connecting said members, said reversing gearing including two clutches, a slide, means operated by the driving member to continuously reciprocate said slide, a clutch-engaging and a clutch-disengaging bolt carried by the slide, and automatic means to throw said bolts into and out of operative position.

18. In a reversing mechanism, the combination with a driving member and a driven member, of reversing gearing connecting said members, said reversing gearing including two clutches, a slide, means operated by the driving member to continuously reciprocate said slide, a clutch-engaging and a clutch-disengaging bolt carried by the slide, automatic means to throw said bolts into and out of operative position, and time mechanism actuated by the driving member to control the time of operation of said automatic means.

19. In a reversing mechanism, the combination with two clutches, of a continuously-reciprocating slide, a clutch-engaging and a clutch-disengaging bolt carried by the slide and adapted to operate both clutches, automatic means to throw the bolts into and out of operative position, and a manually controlled lock for locking said bolts against movement.

20. In a reversing mechanism, the combination with two clutches, of a continuously-reciprocating slide, a clutch engaging and a clutch-disengaging bolt carried by the slide, each bolt adapted to operate both clutches, automatic means to throw the bolts into and out of operative position, and a manually-controlled lock for locking one or both of the bolts against movement.

21. In a reversing mechanism, the combination with two clutches, of a continuously-reciprocating slide, a clutch-engaging and a clutch-disengaging bolt carried by the slide, each bolt adapted to operate both clutches, automatic means to throw the bolts into and out of operative position, and a manually-controlled lock adapted in one position to lock the clutch-engaging bolt from movement and in another position to lock both bolts from movement.

22. In a reversing mechanism, the combination with two clutches, of a continuously-reciprocating slide, a clutch-engaging and a clutch-disengaging bolt carried by the slide, each bolt adapted to operate both clutches, automatic means to move said bolts into and out of operative position, a manually-controlled lock to lock the bolts against movement, and an auxiliary lock for one of the bolts.

23. In a reversing mechanism, the combination with two clutches, of a continuously-reciprocating slide, a clutch-engaging and a clutch-disengaging bolt carried by the slide, each bolt adapted to operate both clutches, automatic means to move said bolts into and out of operative position, a manually-controlled lock to lock the bolts against movement, and an auxiliary lock for the clutch-engaging bolt.

24. In a reversing mechanism, the combination with two clutches, of a continuously-reciprocating slide, a clutch-engaging and a clutch-disengaging bolt carried thereby, each bolt being adapted to operate each clutch, means for throwing said bolts into and out of operative position, and means to prevent the clutch-engaging bolt from operating on either clutch until the clutch-disengaging bolt has operated to disengage the other clutch.

25. In a reversing mechanism, the combination with a driving member and a driven member, of reversing gearing connecting said members, said gearing including two clutches, a continuously-reciprocating slide, a clutch-engaging and a clutch-disengaging bolt carried thereby, means to move the bolts into and out of operative position, a manually-controlled locking slide for locking said bolts against movement, and an auxiliary lock for locking the clutch-engaging bolt.

26. In a reversing mechanism, the combination with a driving member and a driven member, of reversing gearing connecting said members, said gearing including two clutches, a continuously-reciprocating slide, a clutch-engaging and a clutch-disengaging bolt carried thereby, means to move the bolts into and out of operative position, a manually-controlled locking slide for locking said bolts against movement, and an auxiliary lock actuated by the manually-controlled lock for locking the clutch-engaging bolt.

27. In a reversing mechanism, the combination with two clutches, of a continuously-reciprocating slide, a clutch-engaging and a clutch-disengaging bolt carried thereby, a bolt-carrier for each bolt, and means for operating said bolt-carrier thereby to move the bolts into and out of operative position.

28. In a reversing mechanism, the combination with two clutches, of a continuously-reciprocating slide, a clutch-engaging and a clutch-disengaging bolt carried thereby, a bolt carrier for each bolt, and time mechanism to move the bolt carriers thereby to throw the bolts into and out of operative position at predetermined times.

29. In a reversing mechanism, the combination with two clutches, of a continuously-reciprocating slide, a clutch-engaging and a clutch-disengaging bolt carried thereby, a bolt carrier for each bolt, and a rocker for operating said bolt carriers.

30. In a reversing mechanism, the combination with two clutches, of a continuously-reciprocating slide, a clutch-engaging and a clutch-disengaging bolt carried thereby, a bolt carrier for each bolt, a rocker for operating said bolt carriers, and yielding connections between said rocker and each carrier.

31. In a reversing mechanism, the combination with two clutches, of a continuously-reciprocating slide, a clutch-engaging and a clutch-disengaging bolt carried thereby, a rocker for throwing said bolts into and out of operative position, and yielding connections between said rocker and said bolts.

32. In a device of the class described, the combination with a driving member and a driven member, of reversing gearing connecting said members, said reversing gearing including two clutches, a continuously-reciprocating slide, a clutch-engaging and a clutch-disengaging bolt carried thereby, á rocker for throwing said bolts into and out of operative position, and means to operate said rocker continuously at predetermined times.

33. In a device of the class described, the combination with a driving member and a driven member, of reversing gearing connecting said members, said reversing gearing including two clutches, a continuously-reciprocating slide, a clutch-engaging and a clutch-disengaging bolt carried thereby, a rocker for throwing said bolt into and out of operative position, means to operate said rocker continuously at predetermined times, and a yielding connection between said rocker and each bolt.

34. In a device of the class described, the combination with a driving member and a driven member, of reversing gearing connecting said members, said reversing gearing including two clutches, a continuously-reciprocating slide, a clutch-engaging and a clutch-disengaging bolt carried thereby, a rocker for throwing said bolts into and out of operative position, means to operate said rocker continuously at predetermined times, a yielding connection between said rocker and each bolt, and manually-controlled means to lock one or both of the bolts from movement.

35. In a reversing mechanism, the combination with a driving and a driven member, of reversing gearing connecting said members, said gearing including two clutches, a continuously-reciprocating slide, a clutch-engaging and a clutch-disengaging bolt carried thereby, a rocker for throwing said bolts into and out of operative position, a cam for operating said rocker, and means to turn said cam first in oné direction and then in the other.

36. In a reversing mechanism, the combination with a driving and a driven member, of reversing gearing connecting said members, said gearing including two clutches, a continuously-reciprocating slide, a clutch-engaging and a clutch-disengaging bolt carried thereby, a rocker for throwing said bolts into and out of operative position, a cam for operating said rocker, and means operated by the driving member to turn said cam first in one direction and then in the other.

37. In a reversing mechanism, the combination with a driving and a driven member, of reversing gearing connecting said members, said gearing including two clutches, a reciprocating slide, clutch engaging and clutch disengaging bolts carried thereby, a rocker for throwing said bolts into and out of operative position, means for actuating said rocker comprising a shaft, a plurality of arms thereon, a cam member having a plurality of cam surfaces, and means operated by the driving member to turn said cam first in one direction and then in the other to rock said arms alternately.

38. In a reversing mechanism, the combination with a driving and a driven member, of reversing gearing connecting said members, said gearing including two clutches, a reciprocating slide, clutch engaging and clutch disengaging bolts carried thereby, a rocker for throwing said bolts into and out of operative position, means for actuating said rocker comprising a shaft, a plurality of arms thereon, a longitudinally movable shaft, a cam member thereon having a plurality of cam surfaces, and gears operated by the driving member to turn said cam first in one direction and then in the other direction to rock said arms alternately.

39. In a reversing mechanism, the combination with two clutches, of a reciprocating slide, a clutch engaging and a clutch disengaging bolt carried thereby, each bolt being adapted to operate each clutch, automatic means to operate said bolts comprising a shaft and a plurality of sleeves thereon each having a cam engaging arm, time mechanism to control the operation of the automatic means comprising said shaft and sleeves, one of the sleeves being loose on the shaft, means to relatively adjust said sleeves to vary the distance between said arms, and means to relatively lock said sleeves in adjusted position.

40. In a device of the class described, the combination with a driving member and a driven member, of reversing gearing connecting said members, said reversing gearing including two clutches, a reciprocating slide, clutch operating mechanism carried thereby comprising a plurality of bolts, a plurality of bolt carriers therefor, and time mechanism governing the time of operation of said clutch operating mechanism.

41. In a device of the class described, the combination with a driving member and a driven member, of reversing gearing connecting said members, said reversing gearing including two clutches, a reciprocating slide, clutch operating mechanism carried thereby comprising a plurality of bolts each provided with a groove, a bolt carrier for each bolt slidably mounted, each carrier provided with a rib to engage said groove, said carriers each comprising a shell, a plurality of pins therein, springs to actuate said pins, and a carrier having a rocker arm receiving aperture.

42. In a device of the class described, the combination of a driving shaft, a pulley sleeve loose thereon and provided with a clutch member, a clutch member fast on said shaft, a second clutch member fast on the shaft, a coöperating clutch member loose on said shaft, a separate driven shaft, a clutch member loose on the driven shaft and geared to the clutch member which is fast on the driving shaft, a second clutch member fast on the driven shaft and geared to the clutch member which is loose on the driving shaft and automatic means to operate said clutches.

43. In a reversing mechanism, the combination of a driving shaft, a pulley sleeve loose thereon and provided with a clutch member, a coöperating clutch member fast on said shaft, means to lock and unlock said first named clutch member to and from the driving shaft, a separate driven shaft, a coiled brake member thereabout, means to operate said brake connected with said clutch locking means whereby said brake is applied to the driven shaft when the clutch is unlocked from the driving shaft and whereby the brake is released from the driven shaft when the clutch is locked to the driving shaft, another clutch member fast on the driving shaft, a coöperating clutch member loose on said shaft, a clutch member loose on the driven shaft and geared to the clutch member which is fast on the driving shaft and another clutch member fast on the driven shaft and geared with the clutch member which is loose on the driving shaft, and automatic means to operate said clutches.

44. In a reversing mechanism, the combination with a driven shaft having a hardened curvilinear disk on the end thereof, of bearings to receive the end thrust of said shaft comprising a hardened, curvilinear end bearing member, a hardened curvilinear bearing member between said first named disk and said end bearing member, a driving shaft, reversing gearing connecting said shafts, said reversing gearing including a clutch on each shaft, and means operated by said driving shaft to control the operation of the clutches.

45. In a device of the class described, the combination of a shaft having a cam thereon, a bearing for said shaft threaded thereto permitting relative rotative and longitudinal movement of the shaft, and means to retain said shaft in alinement with said bearing on disengagement of the threaded connection between said shaft and bearing.

In testimony whereof, I have signed my name to this specification, in the presence of two subscribing witnesses.

WILLIAM A. E. HENRICI.

Witnesses:
BERTHA F. HEUSER,
THOMAS J. DRUMMOND.